Figures 1, 2:
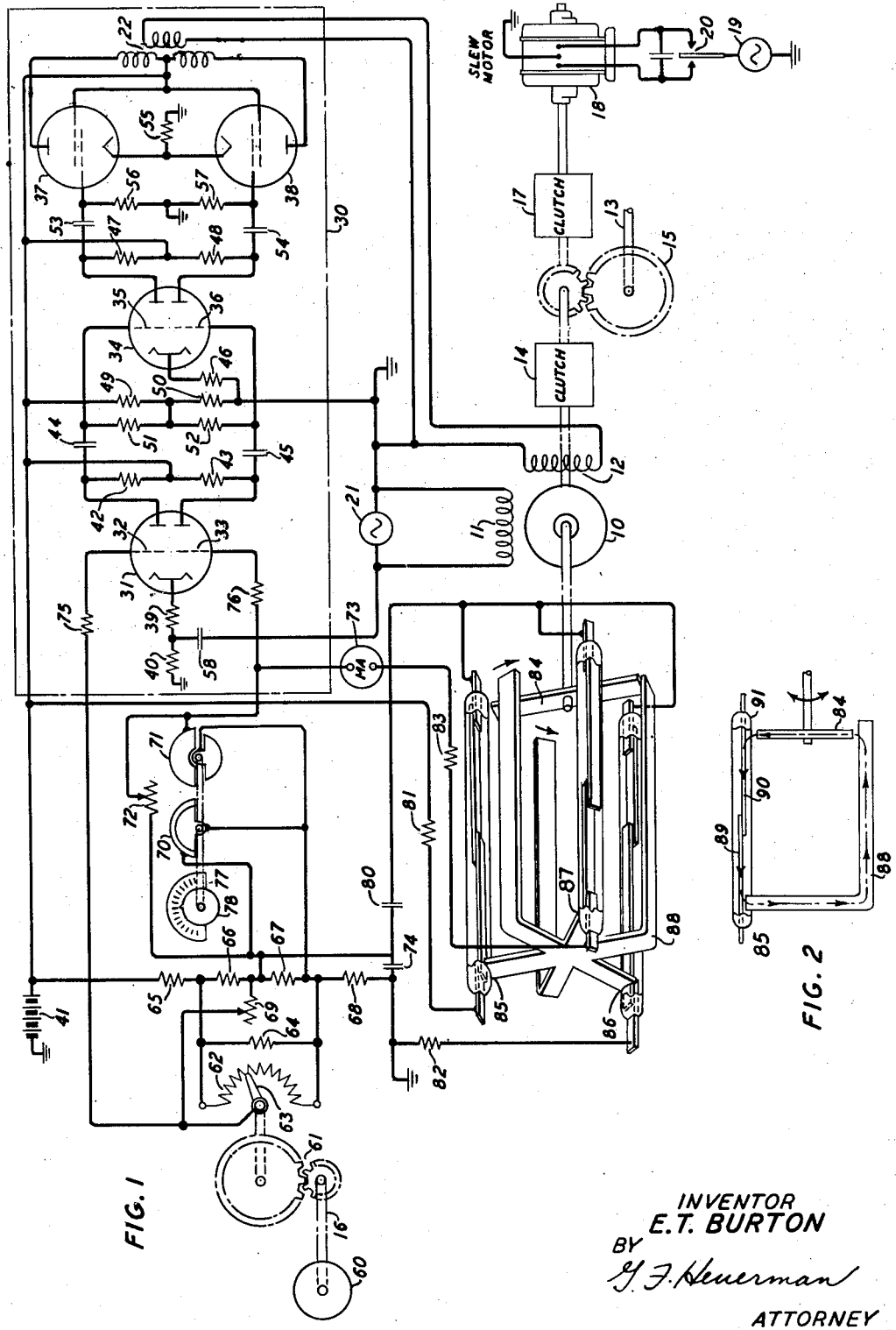

Nov. 15, 1949     E. T. BURTON     2,488,373

MOTOR SPEED CONTROL APPARATUS

Filed June 12, 1945

INVENTOR
E.T. BURTON
BY
G.F. Heuerman
ATTORNEY

Patented Nov. 15, 1949

2,488,373

UNITED STATES PATENT OFFICE 2,488,373

MOTOR SPEED CONTROL APPARATUS

Everett T. Burton, Millburn, N. J., assignor to Bell Telephone Laboratories, Incorporated, New York, N. Y., a corporation of New York Application June 12, 1945, Serial No. 598,998

11 Claims. (Cl. 318—309)

This invention relates to electric control apparatus and particularly to such apparatus for setting up a voltage for controlling the energization of an electric motor in response to angular displacement of a shaft.

An object of the invention is to provide improved electrical apparatus for controlling the angular velocity and phase of a controlled or output shaft in response to angular displacement of an input or controlling shaft.

Another object is to provide novel apparatus for generating a current or voltage proportional to the speed of a shaft.

In accordance with a specific embodiment of the invention herein shown and described for the purpose of illustration, there are provided a motor for driving an output shaft and an electrical system for supplying electric energy to the motor under control of an input shaft. While the output shaft may be coupled to any desired apparatus, the control system is particularly adapted for use in a system for tracking or following a target with respect to each of a plurality of coordinates, such a system being disclosed for example in a copending application of E. B. Ferrell, Serial No. 523,717, filed February 24, 1944. When used in such a system, the motor shaft may be coupled to a directional antenna for following a target with respect to azimuth and elevation or to a range indicator for indicating the range of a target.

For driving the output or controlled shaft there is provided a two-phase induction motor to one winding of which is supplied alternatng current from a power source and to the second winding of which is supplied alternating current of the same frequency as that of the current supplied to the first winding the amplitude of which may vary and which leads or lags by 90 degrees the current supplied to the first winding, the direction of rotation of the output shaft depending upon whether this current is leading or lagging. A modulator-amplifier is provided for supplying modulated alternating current to the second motor winding which is connected to the output of the modulator-amplifier. The phase and amplitude of the voltage impressed upon the motor from the output of the modulator-amplifier is controlled in response to angular displacement of an input or controlling shaft which may be rotated by means of a handwheel, the direction of rotation of this shaft from a fixed reference position for which zero voltage is impressed upon the second motor winding determining the phase of the voltage impressed upon the winding. A potentiometer having a movable contact coupled to the controlling shaft is provided for setting up and impressing upon the input of the modulator-amplifier a control voltage the polarity of which changes in response to a reversal of the direction of displacement of the controlling shaft from the reference position and the amplitude of which increases as the control shaft displacement is increased, and vice versa.

There is also provided means for generating under control of the output shaft a voltage which is fed back to the input of the modulator-amplifier. The generator comprises a small rotating magnet mounted on the motor shaft and three switches positioned about the axis of rotation of the magnet so that the contacts of the switches, respectively, are closed in a certain order when the shaft rotation is in one direction and in reverse order when the shaft rotation is reversed. Closure of one of the switch contacts completes a circuit for charging a small capacitance, called a "dipper" condenser, to a certain voltage in one direction, closure of the contacts of a second switch completes a circuit for charging the condenser to substantially the same voltage in the reverse direction and closure of the third switch contact causes the condenser to discharge through a circuit comprising an impedance connected in the input circuit of the modulator-amplifier. The average amplitude of the condenser discharge current is proportional to the speed of the output shaft and the direction of the current depends upon the direction of rotation of the output shaft. The use of a generator of this type has the advantage that it results in only a very slight increase of the inertia associated with the motor shaft. The feedback voltage thus produced across the impedance in the input of the modulator-amplifier effectively opposes the voltage impressed upon the modulator-amplifier from the input potentiometer with respect to its effect upon the motor energization so that for any displacement of the input shaft from the reference position, the voltage impressed upon the motor from the modulator-amplifier is determined by the difference of the input potentiometer voltage and the feedback voltage which is proportional to the motor speed. If for some reason the motor speed is decreased to a value less than it should be for a certain displacement of the controlling shaft, for example, the difference of the potentiometer voltage and the feedback voltage increases to cause increased voltage to be supplied to the motor to cause its speed to increase to the proper value.

The impedance across which the feedback voltage is produced in response to the current supplied thereto by the discharge of the dipper condenser comprises a variable resistance and a variable capacitance connected in parallel. When the motor shaft is running at a fixed speed corresponding to a certain displacement of the controlling shaft with respect to the fixed reference position, the discharge current of the dipper condenser flows through the resistance element of the impedance in the input of the modulator-amplifier. When the displacement of the input shaft is increased for example, the motor speed is increased and the capacitive portion of the impedance in the input circuit is charged by current from the dipper condenser to an increased voltage. When the condenser has been charged to the new value, the motor runs at an increased speed corresponding to the increased displacement of the controlling shaft. While the condenser of the input impedance is being charged, however, excess voltage is applied to the motor to cause it to run at an excess speed, thus introducing an additional displacement of the output shaft during the charging interval. The action is similar when the displacement of the input shaft is decreased except that in this case the voltage applied to the motor is decreased to cause its speed to decrease and the capacitive portion of the input impedance discharges through its shunt resistance. The transient voltage component applied to the motor due to the charging or discharging of the capacitive portion of the input impedance varies in accordance with the rate of change of displacement of the controlling shaft. The displacement of the output shaft thus has a first component, called the rate component, which varies with the integral of the handwheel displacement and a second component, called the displacement component, which varies with the handwheel displacement. The resistance of the input impedance may be varied for adjusting the rate component, and the capacitance of the input impedance may be adjusted for controlling the displacement component.

The illustrative embodiment of the invention will now be described in greater detail with reference to the accompanying drawing in which:

Fig. 1 is a schematic view of a motor control system embodying the invention; and Fig. 2 is a schematic view of a portion of Fig. 1 in detail.

There is provided a two-phase induction motor 10 having stator windings 11 and 12 for driving in either direction an output shaft 13 through a clutch 14 and gearing 15 when current is supplied to winding 12 in response to displacement from a fixed reference position of an input or controlling shaft 16. The shaft 13 may also be driven in either direction at a relatively high speed through a clutch 17 by a motor 18 when a circuit for supplying current from alternating current source 19 to the motor is completed through one of the contacts of a switch 20. Alternating current of fixed amplitude and phase is supplied to the motor winding 11 from an alternating current supply source 21 having a frequency of 60 cycles per second, for example, and having one of its terminals grounded. Current having the same frequency as that supplied to winding 11 and in phase quadrature with respect thereto is supplied to motor winding 12 from the output transformer 22 of a modulator-amplifier 30. The speed of rotation of the shaft 13 varies with the voltage across the winding 12. The shaft 13 is caused to rotate in one direction when the phase of the voltage across winding 12 leads the voltage across winding 11 and in the opposite direction when the voltage across winding 12 lags that across winding 11.

The modulator-amplifier for controlling the amplitude and phase of the voltage across the motor winding 12 in response to the voltage impressed upon the input of the modulator-amplifier circuit comprises a twin triode space discharge tube 31 (6SL7-GT) having triodes 32 and 33, a second twin triode tube 34 (6SL7-GT) having two triodes 35 and 36 and two tetrode space discharge tubes 37 and 38 (6V6), the designations in parentheses referring to the types of tubes which may be used. The cathodes of triodes 32 and 33 are connected through 0.2-megohm resistor 39 and 2700-ohm resistor 40 in series to ground. Anode current is supplied to triode 32 from 250-volt battery 41, or a rectifier if desired, having its negative terminal grounded, through a circuit comprising in series 33,000-ohm resistor 42, the anode-cathode path and resistors 39 and 40. Anode current is similarly supplied to triode 33 through a circuit comprising in series 33,000-ohm resistor 43, the anode-cathode path and resistors 39 and 40. The anode of triode 32 is connected through a 0.1-microfarad condenser 44 to the control electrode of triode 35, and the anode of triode 33 is connected through a 0.1-microfarad condenser 45 to the control electrode of triode 36. The cathodes of triodes 35 and 36 are connected through 0.12-megohm resistor 46 to ground. Anode current for triode 35 is supplied from source 41 through a circuit comprising 68,000-ohm resistor 47, the anode-cathode path and resistor 46 and anode current for triode 36 is similarly supplied through a circuit comprising 68,000-ohm resistor 48, the anode-cathode path and resistor 46. There is provided a voltage divider comprising resistors 49 and 50, each of 68,000 ohms, connected in series, one terminal of resistor 49 being connected to the positive terminal of battery 41 and one terminal of resistor 50 being connected to ground. A 0.18-megohm resistor 51 has one of its terminals connected to the control electrode of triode 35 and its other terminal connected to the common terminal of resistors 49 and 50. A 0.18-megohm resistor 52 has one of its terminals connected to the control electrode of triode 36 and its other terminal connected to the common terminal of resistors 49 and 50. There is thus provided for each of triodes 35 and 36 a biasing voltage equal to the algebraic sum of the steady potential differences across resistors 46 and 50. The anodes of triodes 35 and 36, respectively, are connected through 0.1-microfarad condensers 53 and 54, respectively, to the control electrodes of tetrodes 37 and 38, respectively. The positive terminal of the direct current source 41 is connected to the screen grid of each of tubes 37 and 38. Anode current is supplied from source 41 to tube 37 through a circuit comprising one-half of the primary winding of output transformer 22, the anode-cathode path and a 200-ohm resistor 55 having one of its terminals grounded and its other terminal connected to the cathodes of tubes 37 and 38. Anode current is supplied to tube 38 through a circuit comprising the other half of the primary transformer winding, the anode-cathode path and resistor 55. The control electrodes of tubes 37 and 38 are connected through 0.47-megohm resistors 56 and 57, respectively, to ground.

The ungrounded terminal of alternating current source 21 is connected through 1.0-microfarad condenser 58 to the common terminal of resistors 39 and 40. The resulting alternating current flowing through resistor 40 causes to be impressed upon the control electrode-cathode circuits of triodes 32 and 33 an alternating voltage which is 90 degrees out of phase with respect to the voltage of source 21. If this alternating voltage alone were impressed upon the input of the modulator-amplifier circuit, the amplitude of the output voltage of the modulator-amplifier impressed upon the motor winding 12 would obviously be zero and no displacement of the output shaft 13 would take place. If in addition to the alternating voltage there is applied to the input circuit a voltage for causing the potential of the control electrode of triode 32 to increase with respect to the potential of the control electrode of triode 33 for example, the alternating component of the current flowing through anode resistor 42 will increase with respect to that flowing through anode resistor 43. The resulting alternating voltage across resistors 51 and 52 in series impressed upon the input of the amplifier comprising tubes 34, 37 and 38 will cause to be impressed upon the motor winding 12 an alternating voltage in phase quadrature with respect to the voltage impressed upon winding 11. If the voltage impressed upon the input circuit in addition to the alternating voltage changes to cause the potential of one of the control grids of triodes 32 and 33 to change from a potential which is higher than the potential of the other grid to a potential which is lower than that of the other grid, the output voltage of the modulator-amplifier will be reversed in phase, thus causing a reversal of the direction of rotation of shaft 13.

The amplitude and phase of the alternating voltage impressed upon the motor winding 12 from the output of the modulator-amplifier 30 are controlled in response to angular displacement of the controlling or handwheel shaft 16 from a fixed reference position for which the corresponding voltage supplied to the motor has zero amplitude. The shaft 16 may be displaced by means of a handwheel 60 coupled thereto through gearing 61. There is provided a potentiometer comprising a resistance winding 62 of 20,000 ohms which may be wound upon an annular form and a contact member 63 which is coupled to the shaft 16 but electrically insulated therefrom. A 3,000-ohm resistor 64 is connected across the potentiometer resistance 62. A voltage divider connected across the battery 41 comprises in series resistors 65, 66, 67 and 68, the resistors 65 and 68 each having a resistance of 10,000 ohms and the resistors 66 and 67 each having a resistance of 1,000 ohms. The variable resistor 69 having a maximum resistance of 560 ohms has one of its terminals connected to the common terminal of resistors 66 and 67 and its other terminal connected to the potentiometer contact 63. The voltage drop across the potentiometer resistance 62 is therefore approximately 10 volts. The potentiometer contact 63 is connected through 0.12-megohm resistor 75 to the control grid of triode 32. There is provided an impedance network having variable condensers 70 and 71 in series in one branch path and a variable resistor 72 in a second branch path, a suitable current meter 73 being provided for indicating the very low current flowing through the circuit including the impedance network 70, 71, 72. As shown, condensers 70 and 71 each have a movable plate coupled to a shaft 77 which may be rotated by turning the knob 78 secured thereto. If desired, of course, there may be employed fixed condensers and means for switching them into the circuit in such combinations as to obtain the desired capacitances. The maximum resistance of resistor 72 is 63,000 ohms. The capacities of condensers 70 and 71 are varied simultaneously. When the capacity of condenser 70 is being increased over a range from 6 microfarads to 59 microfarads, that of condenser 71 is simultaneously decreased over a range from 63 microfarads to 10 microfarads, the sum of the capacities of the two condensers remaining approximately fixed. One terminal of the impedance 70, 71, 72 is connected to the common terminal of resistors 66 and 67 and its other terminal is connected through 0.12-megohm resistor 76 to the control grid of triode 33. The common terminal of condensers 70 and 71 is connected to the common terminal of resistors 67 and 68.

Considering the circuit as thus far described, it is apparent that condensers 70 and 71 will each become charged to a voltage equal to the voltage drop across resistor 67 but in opposing directions so that the resultant voltage across the impedance network will be zero. For a given setting of resistor 69, the input voltage to the modulator-amplifier, that is the potential of the control grid of triode 32 with respect to the potential of the grid of triode 33, will increase as the shaft 16 is displaced in one direction from the fixed reference position and will decrease as the shaft 16 is displaced in the opposite direction from the fixed reference position. The rate at which this voltage changes with respect to displacement of shaft 16 depends upon the setting of resistor 69. As the resistance of resistor 69 is decreased, the rate of change of voltage with respect to displacement decreases for displacements near the reference position and increases for displacements in the region of maximum displacement.

Means are provided for generating in a circuit, including impedance 70, 71, 72, a current proportional to the speed of the output shaft 13. For this purpose there is provided apparatus comprising 0.0025-microfarad dipper condenser 80, resistors 81, 82 and 83 each of 470 ohms, a bar magnet 84 mounted on the shaft of motor 10 and reed switches 85, 86 and 87 arranged about the axis of rotation of the magnet so that the switches are closed one at a time in succession in response to the rotation of the magnet, the order in which the switches are closed being determined by the direction of rotation of the magnet. The switches may be of the type disclosed in United States Patent 2,289,830 to Ellwood, July 14, 1942, for example. The resistors 81, 82 and 83 are used as a protection against excess current flowing through the switch contacts. The resistors are mounted very near the respective switch contacts to reduce to a minimum the capacitance of leads, etc., which must be discharged upon closure of the contacts. One terminal of condenser 80 is connected to the terminal of impedance 70, 71, 72 which is connected to the common terminal of resistors 66, 67 and 69. The other terminal of condenser 80 is connected to the reed armatures of switches 85, 86 and 87. A contact of switch 85 is connected through resistor 81 to the positive terminal of battery 41 so that when a circuit is completed through switch 85, condenser 80 becomes charged to the voltage across resistors 65 and 66 in series of the voltage divider. A contact of switch 86 is connected through resistor 82 to ground so that when a circuit is completed through switch 86, the condenser 80 is charged in the reverse direction to the voltage across resistors 67 and 68 in series of the voltage divider, this voltage being equal to the voltage across resistors 65 and 66. A contact of switch 87 is connected to the common terminal of impedance 70, 71, 72 and resistor 76 so that when this switch is closed, a circuit including impedance 70, 71, 72 is closed through which circuit condenser 80 discharges. The average amplitude of the discharge current is proportional to the frequency at which condenser 80 is alternately charged and discharged, that is proportional to the speed of output shaft 13, and the direction of the current flow through impedance 70, 71, 72 changes in response to a reversal of the rotation of shaft 13. As shown in the detail view of Fig. 2, when the bar magnet 84 is in such a position that one of its poles is adjacent to the switching device 85, its other pole is adjacent to a portion of a magnetic yoke member 88, a magnetic path is completed through which flux flows as indicated by the arrows. The switching device 85 comprises spring contact members 89 and 90 of magnetic material enclosed in a vessel 91 which is evacuated or filled with a suitable gas. The end portions of contact members 89 and 90 are therefore attracted into engagement with each other, thereby completing an electric circuit.

For any desired setting of the variable resistor 72 the feedback voltage produced across the impedance 70, 71, 72 is substantially proportional to the current flowing therethrough, as indicated by meter 73, and therefore proportional to the speed of output shaft 13. The voltage set up across the impedance 70, 71, 72 is in opposition to, but of smaller amplitude than, the voltage derived from the potentiometer 62 in the circuit connecting the control electrodes of triodes 32 and 33. If for any reason, such as an increase of load, the motor 10 fails to run at a correct speed as determined by the setting of the handwheel shaft, this inaccuracy is corrected as a result of the feedback voltage applied to the input circuit of the modulator-amplifier 30. If for some reason the motor speed decreases from the correct speed corresponding to a certain displacement shaft 16 for example, the feedback voltage is decreased and the voltage applied to the motor is therefore increased to bring the motor back to proper speed. The setting of variable resistor 72 may be changed for the purpose of increasing or decreasing the speed of the motor for a given displacement of the handwheel shaft.

A transient component is introduced into the voltage impressed upon the input circuit of modulator-amplifier 30 due to the time constant of the circuit through which the discharge current of condenser 80 flows. This voltage is proportional to the rate of change of the voltage impressed upon the input circuit from the potentiometer 62 and it therefore varies in accordance with the rate of change of displacement of the input shaft 16. When the displacement of the input shaft is abruptly increased for example, increased voltage will be impressed upon the input of modulator-amplifier 30 and upon the motor winding 12 to cause the motor to run at increased speed. The feedback voltage across the impedance network 70, 71, 72 therefore also increases to a new value but this voltage rises exponentially due to the time constant of the discharge circuit for condenser 80. An excess voltage is thus transiently applied to the input circuit of the modulator-amplifier to cause the motor to run at excess speed during a transient interval following which the speed of the motor decreases to the normal speed corresponding to the displacement of shaft 16 from its reference position. Due to this excess speed of the motor, it is seen that the shaft is given an additional displacement during the transient period. In other words, there is impressed upon the motor winding 12 a voltage component which varies in accordance with the displacement of the controlling shaft 16 from a fixed reference position to cause the speed of the output shaft to vary correspondingly, and an additional voltage component which varies in accordance with the rate of change of the first voltage component to produce an additional displacement of the output shaft which varies with the displacement of the controlling shaft. The capacity of condensers 71 and 72 may be varied to change the ratio of this displacement component of shaft 13 to the displacement of shaft 16. When the capacity of condenser 71 is increased and that of condenser 70 substantially correspondingly decreased for example, the time constant of the discharge path of condenser 80 is increased to increase the ratio of the displacement component of shaft 13 with respect to the displacement of shaft 16.

Instead of using three switches 85, 86, 87 as described above, an integral multiple of three switches may be employed, each group of three functioning in the same manner as the switches 85, 86 and 87 and all of the switches being arranged about the axis of rotation of the rotating magnet. In this case the condenser is discharged a plurality of times during each revolution of the motor 10. While magnetically operated switches are often preferred, in some cases other switching means such as cam operated switching devices may be used.

What is claimed is:

1. Apparatus for producing an electric signal indicative of the speed and direction of rotation of a shaft comprising a source of unidirectional current, a condenser, a group of switches consisting of three switches or an integral multiple thereof which are operated one at a time repeatedly in succession in response to the rotation of the shaft and in an order dependent upon the direction of rotation of the shaft, a first circuit completed by the operation of one of said switches for causing said condenser to be charged in one direction by current from said source, a second circuit completed by the operation of a second switch for causing said condenser to be charged in the reverse direction by current from said source and a third circuit completed by the operation of a third switch for discharging said condenser, the direction of the discharge current in said third circuit depending upon the direction of rotaton of said shaft and the average amplitude of the current in said circuit varying in accordance with the speed of said shaft.

2. In combination, a source of unidirectional current, a group of switches consisting of three switches or an integral multiple thereof, a rotatable shaft, means coupled to said shaft for operating said switches repeatedly in succession in an order determined by the direction of rotation of said shaft, a condenser, a first circuit completed by the operation of a first of said switches for causing said condenser to be charged in a certain direction by current from said source, a second circuit completed by the operation of a second of said switches for causing said condenser to be charged in the reverse direction by current from said source, and a third circuit including resistive means completed by the operation of a third of said switches for discharging said condenser to produce across said resistive means a voltage substantially proportional to the speed of said shaft the polarity of which is reversed in response to a reversal of the direction of rotation of said shaft.

3. In combination, a source of unidirectional current, a group of switches consisting of three switches or an integral multiple thereof, a rotatable shaft, a motor for driving said shaft, means coupled to said shaft for operating said switches repeatedly in succession in an order determined by the direction of rotation of said shaft, a condenser, a first circuit completed by the operation of a first of said switches for causing said condenser to be charged in a certain direction by current from said source, a second circuit completed by the operation of a second of said switches for causing said condenser to be charged in the reverse direction by current from said source, a third circuit including resistive means completed by the operation of a third of said switches for discharging said condenser to produce across said resistive means a voltage substantially proportional to the speed of said shaft the polarity of which is reversed in response to a reversal of the direction of rotation of said shaft, an energizing circuit for supplying electric energy to said motor to control its speed, and means for impressing upon said circuit to control the electric energy supplied to said motor a voltage comprising said voltage produced across said resistive means.

4. A combination in accordance with claim 2 in which there is provided capacitive means connected across said resistive means.

5. A combination in accordance with claim 3 in which there is provided capacitive means connected across said resistive means the capacitance of which is large relative to the capacitance of said condenser.

6. A combination in accordance with claim 3 in which said energizing circuit comprises means for supplying to said motor alternating current the amplitude and phase of which are controlled in accordance with the amplitude and polarity respectively of the voltage impressed upon said energizing circuit.

7. In combination, a rotatable shaft, a plurality of switches mounted about the axis of rotation of said shaft each having two switching members of magnetic material through which flux may be caused to flow for causing the switch to be actuated, a plurality of partial flux paths of magnetic material including the two switching members of said switches respectively, and a bar magnet secured at a position intermediate its ends to said shaft for successively completing said flux paths and for causing flux to flow therein for successively actuating said switches in an order determined by the direction of rotation of said shaft.

8. A combination in accordance with claim 7 in which said plurality of switches consists of three switches and in which there are provided a condenser, means responsive to the actuation of one of said switches for causing said condenser to be charged to a certain voltage in one direction, means responsive to the actuation of a second of said switches for causing said condenser to be charged to a substantially equal voltage in the opposite direction and means responsive to the actuation of the third switch for completing a discharge circuit for said condenser, the amplitude of the current in said discharge circuit being proportional to the speed of said shaft and the direction of the current corresponding to the direction of rotation of said shaft.

9. In combination, a rotatable shaft, a condenser having two terminals, impedance means having two terminals, means for maintaing a first terminal of said condenser and a first terminal of said impedance means at a common potential, and switching means controlled in response to rotation of said shaft for repeatedly and successively connecting the second terminal of said condenser to a first source of potential having one polarity with respect to said common potential to charge said condenser in one direction, to a second source of potential of opposite polarity with respect to said common potential to charge said condenser in the opposite direction and to the second terminal of said impedance means to discharge said condenser through said impedance means, the order in which said connections are made being determined by the direction of rotation of said shaft, thereby setting up and impressing across said impedance means a voltage having an average amplitude which varies as a function of the speed of said shaft and having a polarity which changes with a reversal of the direction of rotation of said shaft.

10. A combination in accordance with claim 9 in which the potential of said first source of potential with respect to said common potential is substantially equal in magnitude to the potential of said second source of potential with respect to said common potential.

11. In combination a rotatable shaft, a plurality of switches, each switch comprising an elongated housing and a pair of elongated switch members of flexible magnetic material, end portions of said switch members being secured to opposite end portions of said housing respectively, the remaining end portions of said switch members being separated by a short non-conducting gap when the switch is unactuated, a yoke member of magnetic material contiguous to the secured end portion of the first of the switch members of each of said switches and a permanent bar magnet secured to said shaft for completing magnetic paths between said yoke member and the secured end portion of the second of the switch members of said switches respectively repeatedly in succession, thereby causing flux to flow through the switch members of said switches and thus cause electrically conducting paths to be completed through said switches repeatedly in succession.

EVERETT T. BURTON.

REFERENCES CITED

The following references are of record in the file of this patent:

UNITED STATES PATENTS

| Number | Name | Date |
| --- | --- | --- |
| 1,571,960 | Needham | Feb. 9, 1926 |
| 1,665,857 | Needham | Apr. 10, 1928 |
| 1,844,243 | Crout | Feb. 9, 1932 |
| 2,091,025 | Breer et al. | Aug. 24, 1937 |
| 2,375,158 | Wills | May 1, 1945 |

FOREIGN PATENTS

| Number | Country | Date |
| --- | --- | --- |
| 491,421 | Germany | Feb. 10, 1930 |
| 576,685 | Germany | May 12, 1933 |